3,169,875
PROCESS FOR PRODUCING A DEHYDRATED PUMPKIN PRODUCT
Maurice W. Hoover, Raleigh, N.C., assignor to North Carolina State College of the University of North Carolina, as represented by the business manager
No Drawing. Filed Dec. 4, 1962, Ser. No. 242,067
5 Claims. (Cl. 99—204)

This invention relates to a method for preparing a dehydrated pumpkin (*Cucurbita maxima* and *Cucurbita pepo*) product generally called instant pumpkin flakes or instant pumpkin mix.

The process consists essentially of (a) cooking the cut and deseeded pumpkin, (b) pulping the cooked material to remove any undesirable materials and to produce a mashed or pureed pumpkin product, (c) adding controlled amounts of starch and sugar to the puree, and (d) dehydrating the resulting product on a drum dryer to less than 6 percent moisture.

Pumpkins are relatively low in total solids, usually ranging between 7 and 10 percent. Because of the low solids content, pumpkin is difficult to dry on a drum dryer. In order to increase the percent solids in the processed product cooked pumpkin is often squeezed in a pumpkin squeezer. This pressing action removes a portion of the liquid and results in a higher percent solids. It also results in a loss of a large portion of the soluble solids and much of the flavor constituents which are needed to give the product a full bodied flavor.

The conventional procedure generally followed in preparing and processing pumpkin by canning or freezing consists of first cutting the pumpkin in a cutter, and washing the cut pieces in a reel washer to remove seeds and extraneous materials. The pieces are then passed over an inspection belt after which they are cooked with steam by injection or in a heat exchanger. The cooked or partially cooked pumpkin is then run through the pumpkin squeezer to remove a portion of the liquid fraction. The solid fraction remaining is then passed through a series of comminutors and pulpers to give the product a smooth consistency. The pumpkin thus prepared is filled into cans and sterilized or packaged and frozen.

A problem encountered in dehydrating pumpkin is the very high moisture content of the cooked puree, particularly when the squeezing step is avoided in order to retain the soluble solids.

Another problem is that straight or unmodified cooked pumpkin puree does not stick properly to the drum dryer during dehydration thus making it difficult to dehydrate.

Another problem encountered in dehydrating pumpkin that is made up of 90 percent water or more on a drum dryer is that the flavor is adversely affected during dehydration resulting in a product that lacks the full bodied fresh pumpkin flavor.

Furthermore, when straight or unmodified (without added starch or sugar) cooked pumpkin puree is dehydrated on a drum dryer, the resulting product is very porous and possesses a low bulk density. The light, fluffy or porous flake made from the unmodified or straight pumpkin puree has a relatively short shelf life unless packaged under vacuum or inert gas.

With the aforementioned problems associated with the manufacture of a dehydrated pumpkin flake or pumpkin mix in mind, an object of the present invention is to provide a high quality full bodied fresh flavored dehydrated pumpkin product by cooking the cut and trimmed pumpkin in a heat exchanger or with live steam by a system that retains most of the water soluble solids and various flavor components.

Another object is to provide a process whereby the drying characteristic of the pumpkin puree is improved by adding controlled amounts of starch and sugar to the pumpkin or pumpkin puree prior to dehydration on a drum dryer.

Another object is to provide a process whereby the cooked pumpkin can be dried with greater speed and efficiency on a drum dryer by the addition of controlled amounts of starch and sugar to the pumpkin.

Still another object is to provide a process whereby a pumpkin product is produced which has a longer than normal storage or shelf life by adding controlled amounts of starch and sugar to give a more dense and less porous dehydrated product.

Still another object is to provide a process whereby the fresh full bodied pumpkin flavor is better retained in the dehydrated product by the addition of sugar to the pumpkin prior to dehydration.

Another object is to provide a method whereby starch may be more easily incorporated into the puree by first cooling the cooked pumpkin puree in a heat exchanger to a temperature below the gelatinization point of the starch prior to its addition to the pumpkin. The gelatinization temperature of starch usually ranges between 160 and 170° F.

Briefly stated, the process of the present invention comprises first the use of the conventional processing techniques known to the art of (a) cutting the pumpkin into pieces, (b) removing the seeds and other undesirable materials by washing in a reel type washer with water under pressure, (c) inspection of the cut and washed pieces, and (d) cooking the pumpkin in a steam cooker or heat exchanger. Up to this point in the preparation and processing of pumpkin, the technique is similar to the process generally used for canned and frozen puree and one which is well known by the art.

In the production of instant pumpkin flakes it is important to the quality of the finished product that as much of the condensate be retained as possible during cooking in order to minimize the loss of the soluble solids and flavor components. The cooked pumpkin is then pulped or pureed in a pulper finisher fitted with a screen containing openings ranging between 0.02 and 0.1 inch in diameter. The screened puree is cooled in a heat exchanger to a temperature below 170° F. but generally around 160° F. prior to the addition of starch. Starch and sugar are then added to the pumpkin puree at a rate that will increase the total solids of the puree to above 10 percent, but generally around 16 or 18 percent total solids. The amount of starch added to the pumpkin puree should account for no more than 30 percent of the total dry weight of the pumpkin puree mix. The sugar solids added to the pumpkin should be less than 50 percent of the total dry weight of the puree mix. Pumpkin solids in the mix should range between 20 and 85 percent of the total. Generally speaking, the ratio of starch to sugar solids should range between 1:3 and 1:3.5.

In order to facilitate proper mixing of the starch with the other ingredients, it is first necessary to cool the puree to a point below the gelatinization temperature of the starch to be added. A non-gelatinized starch is preferred. The gelatinization point may vary slightly with different starches, but a temperature of 160 is usually sufficient. If this step is not followed closely, the starch will become lumpy with gelatinization and thus not result in a smoothly mixed product. The pumpkin puree or mix is then dehydrated on a drum dryer that is heated with steam at a pressure ranging from 50 and 90 pounds per square inch.

Variations or modifications of the procedure described above are possible without departing from the scope of the invention.

As one example of the present process, a batch of pumpkins was cut into pieces and the seeds removed by washing in a reel washer. The washed pieces were run over an inspection table where the stems and undesirable materials were removed. The cut pumpkin was then fed into a cutter or chopper where it was cut into smaller pieces about ½ inch thick. The pumpkin was conveyed from the cutter to a screw type steam cooker where it was cooked for 20 minutes with live steam at atmospheric pressure. After the product was cooked, it was pulped in a pulper finisher fitted with a screen containing 0.033 inch openings. The puree was then pumped to a stainless steel mixing tank through a heat exchanger. The puree was cooled in the heat exchanger to 160° F. on its way to the mixing tank. To a mixing tank containing 1500 pounds of pumpkin puree which had a solids content of 7.8 percent were added 141 pounds of corn sugar solids, 43 pounds of non-gelatinized starch, and 19 ounces of a 10 percent Tenox IV emulsion. This amount of Tenox IV represented approximately 150 parts per million of butylated hydroxyanisole and butylated hydroxytoluene on a dry weight basis. The contents of the tank were then pumped to a double drum dryer where it was dehydrated to between 2 and 4 percent moisture. The drum dryer was heated with internal steam at a pressure of 70 pounds. The sheets of dried pumpkin were broken and ground into flakes. The flakes were then packaged in cans under a nitrogen atmosphere.

Having described my process for producing a dehydrated pumpkin product and the method of practicing same, what I claim as my invention is:

1. The process for producing pumpkin flakes having improved flavor and storage stability comprising: adding sugar and ungelatinized starch to a pumpkin puree maintained at an elevated temperature below 170° F. to increase the total solids of said puree to above 10%, the weight ratio of starch to sugar solids being between 1:3 and 1:3.5, the total amount of starch added accounting for up to 30% of the total dry weight of the mixture and the amount of sugar added accounting for less than 50% of the total dry weight of the mixture, the pumpkin solids in said mixture ranging between 20 and 85% of the weight of the mixture and dehydrating said mixture to a moisture content less than 6%.

2. The process of claim 1 in which the temperature of said puree is approximately 160° F., starch and sugar are added to increase the total solids of the puree to approximately 16–18% by weight and said puree is dehydrated to a moisture content of between 2 and 4%.

3. The process of claim 1 in which an anti-oxidant selected from the group consisting of butylated hydroxyanisole and butylated hydroxytoluene is added to said puree.

4. The process of claim 1 in which said puree is produced by cooking washed pumpkin pieces at a temperature in excess of 170° F. and screened by passing the same through a screen containing openings ranging between 0.02 and 0.1 inch in diameter.

5. The process of claim 1 in which said mixture is dehydrated on a dryer having its surface heated with steam at a pressure of from 50–90 p.s.i.

References Cited by the Examiner
UNITED STATES PATENTS

| | | | |
|---|---|---|---|
| 94,375 | 8/69 | Ayer et al. | 99—204 |
| 240,900 | 5/81 | Fickett | 99—204 |
| 592,906 | 11/97 | Gere | 99—204 |
| 745,565 | 12/03 | Brown | 99—204 |

OTHER REFERENCES

Food Technology, vol. 4, April 1950, p. 151.
Food Technology, vol. 11, May 1957, p. 260.

A. LOUIS MONACELL, *Primary Examiner.*